3,368,712
SEMICRYSTALLINE GLASS AND METHOD OF APPLYING THE SAME TO METALLIC BASES
Elbert A. Sanford and Donald H. Hall, Rochester, N.Y., and Gordon P. K. Chu, Piscataway, N.J., assignors to Ritter Pfaudler Corporation, a corporation of New York
Continuation of application Ser. No. 40,610, July 5, 1960. This application Nov. 10, 1966, Ser. No. 593,346
6 Claims. (Cl. 220—64)

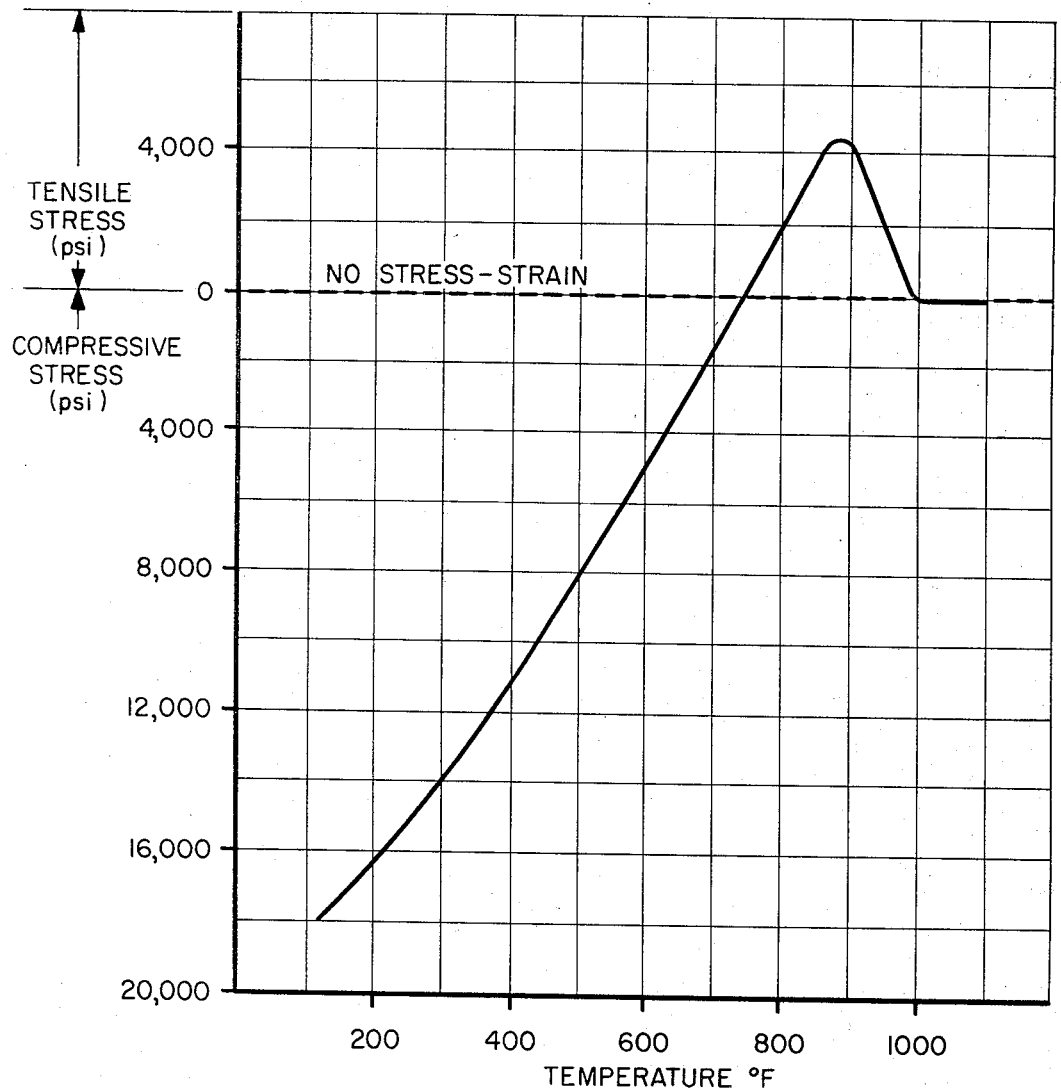

ABSTRACT OF THE DISCLOSURE

Metal vessels having a corrosion, abrasion and impact resistant glassy coating containing a multiplicity of very small crystals formed in situ and distributed throughout the coating, and process for manufacturing the same consisting of fusing the glassy coating on the surface of a vessel and maintaining the same at a crystallization temperature for formation of crystals in the glassy layer or in the glassy coating. Composition of the coatings and fusing temperatures are disclosed.

---

This invention relates to semicrystalline glasses, methods of making the same, and more particularly to methods of applying the same to metallic bases to form impervious coatings thereon having superior mechanical strength, impact and abrasion resistance, and high resistance to corrosion, oxidation and other forms of chemical attack.

It has been shown that partial crystallization of glass can be carried out under controlled conditions for the production of a semicrystalline material having a high strength, great erosion and abrasion resistance, and other properties superior to that of uncrystallized or amorphous glasses. It is an object of this invention to provide such semicrystalline glasses having a wider range of compositions and superior properties to those heretofore known, and which are adaptable for application to metallic bases to form superior coatings thereon.

The protection of metallic articles with a coating of glass or vitreous enamel has long been known. Such coatings exhibit all the desirable properties of glass. However, such coatings have limited resistance to abrasion, to thermal and mechanical shock, and to other mechanical stresses. The use of such coatings has been restricted to applications where the thermal or mechanical shock, abrasion or other such stresses were relatively low and where the superior corrosion resitsance or other desirable properties of the glassy structure more than offset its disadvantages.

While such glass or vitreous enamel-coated objects have found wide use in the chemical industry because of their superior resistance to chemical attack, and more particularly their resistance to acids at high temperatures, their use has been restricted by the relative mechanical weakness, frangibility and vulnerability to mechanical and thermal shock. It is, therefore, another object of this invention to provide a better non-metallic coating, having the chemical resistance, impermeability, and other desirable characteristics of the glass or vitreous enamel coatings heretofore in use, but having greatly improved mechanical strength, thermal shock, impact and abrasion resistance.

It has recently been discovered by various investigators that the properties of glass may be considerably altered and improved by an incorporation of discontinuous or discrete non-glassy particles therein. Specifically, it has been found that strength and impact, thermal shock, and abrasion resistance of glasses can be considerably enhanced by a controlled partial crystallization or devitrification, which results in a material containing a percentage of a crystalline phase precipitated therein. These partially crystallized or devitrified glasses retain, in large measure, all the desirable non-reactive properties of the original glass itself. These improved glasses have exhibited great promise for the production of objects which are subjected to high and changing temperatures. It is, therefore, another object of this invention to develop a method for applying a coating of such partially crystallized glasses to metallic substrates to form a superior coating having, in large measure, the desirable porperties of glass or vitreous enamel, and in addition exhibiting superior strength to mechanical and thermal shock and abrasion.

A further object of this invention is the provision of a superior coating for metallic substrates having the above advantages of thermal and mechanical shock resistance without sacrificing the desirable properties of glass or vitreous enamel.

The crystallized glasses, by their very nature, are extremely refractory and have high melting points. However, in order to apply a coating to a metallic base, it is necessary that the coating be fused in place in order to produce a smooth, adherent, uniform coating covering the entire surface of the base and having no imperfections or pinholes which could serve as starting places for corrosive attack and subsequent failure of the base. It is, therefore, necessary to provide a coating material having a fusing or melting point below the maximum temperature to which the metallic base can safely be heated without warpage, oxidation, or other undesirable effects. This end is generally attained in the vitreous enamel industry by formulating the enamel to have a fusing point considerably below the maximum temperature to which the base can be heated. However, since crystalline coatings have a very high melting point, this is not always possible. For this reason, it has been found best to apply the coating composition to the metallic substrate in the amorphous or uncrystallized form in which it is easily fusible in order to allow the glass composition to melt on the surface of the base to form an adherent uniform continuous glassy coating. The coated object is then subjected to a heat treatment cycle causing the glass to nucleate and crystallize in situ, producing a partially crystalline coating. By means of this technique, it is possible to produce an adherent, even smooth coating on a metallic base, with the coating having a higher softening point than the parent glass itself. The provision of a method for applying an amorphous glass to the surface of a metalic base, and then subsequently subjecting the coated base to a heat treatment cycle to cause the glass to nucleate and partially crystallize is another object of this invention.

One important requirement in the vitreous enamel industry is the adjustment of the properties of the enamel so that it "fits" the object to be coated: that is, enamel must have a coefficient of thermal expansion which bears a definite relation to the coefficient of expansion of the base metal itself. When the enamel is applied to the base metal, and fired at high temperature, each particle of glass becomes viscous and fuses to neighboring particles, forming a thin layer covering the entire base. When the enameled base is cooled, the base metal begins to contract. As long as the enamel is in a plastic form, it can adjust to the change in dimension of the base and no stresses are set up. However, as the base metal enamel system is further cooled, it passes the point where enamel hardens or "sets" and can no longer accommodate itself to the change in dimension of the base. As the system further cools, both the base metal and the enamel continue to contract at a rate depending on their respective coefficients of thermal expansion. If the coefficients of thermal expansion of enamel and the glass were identical (which is never the case in practice), then no stresses would be set up as the base metal enamel system cooled to room temperature. If the enamel should have a coefficient of thermal expansion smaller than that of the base metal (which is the usual case), it would tend to contract less rapidly and would be in compression when the system had cooled at room temperature. The magnitude of the stress depends on the difference in coefficients of expansion of the enamel and the base metal, on the "set point" of the enamel or the temperature at which the enamel is rigid enough to begin to take on sress and, to a lesser extent, on such properties as modulus of elasticity, and so forth. Thus, the enamel is generally subjected to stresses of considerable magnitude depending on the relationship between the coefficients of thermal expansion as described above.

It is known that in order to produce a stable enamel coating on a metallic base, there are certain limits of allowable stresses for the enamel. Since glass of vitreous enamel is stronger in compression than in tension, it is desirable and, in fact, from a practical point of view, necessary to have the enamel in compression rather than in tension in the system at the temperature at which it will be used. The optimum magnitudes of these compressive stresses depend on the mechanical strength and modulus of elasticity of the enamel, the shape or configuration of the coated surface and the ultimate strength of the enamel.

It has, therefore, been found necessary to adjust the properties of the vitreous enamel to conform to the properties of the base metals to be coated so that a metal enamel system will be formed wherein the enamel will be subjected to compressive stresses within the allowable limits.

The "fitting" of the coating to the base metal is also necessary in the case of coatings formed of partially crystallized glass, for the same reasons as described above in connection with enamel. However, in the case of partially crystallized glass, the variables controlling the coefficient of thermal expansion of the coating are more complex. In the case of crystallized coatings, not only is the total residual stress in the coating controlled by the initial composition, but also by the heat treatment which determines the size, composition and the amount of the crystals existing in the coating, and the composition of the residual glassy phase. It is a further object of this invention to provide a formulation and a heat treatment cycle to form a coating with the correct thermal expansion and over-all residual compressive stress.

The fact that the initial composition of the coating and the subsequent heat treatment can control the properties of the final crystallized glass coating renders it possible to control these properties as described above, and in addition renders it possible to provide coatings of varying properties on different portions of a single object. For example, it might become desirable to provide a coating having relatively high residual compressive stress on the concave portions of a given piece of apparatus, and a coating having residual stresses of a smaller magnitude on the convex portions thereof. It is a further object of this invention to control the physical properties of the coating applied to different portions of the base metal to obtain the maximum efficiency and durability of the coating on various portions depending on the character thereof.

Since the object of surface coatings is to impart corrosion or oxidation resistance, impermeability to gases, or other desirable properties to the base metal, it naturally follows that the coating must possess these properties in as great a degree as possible. Considerable progress has been made, for example, in devising formulae for glassy or vitreous enamel coatings which exhibit resistance to the corrosive attack of almost all acids, (except hydrofluoric) at almost all concentrations and temperatures within the useful range of the enamel, and other compositions have been developed which are also resistant to oxidation under a wide range of conditions. In order to have the crystallized glass coatings capable of serving under various environmental conditions, it is necessary that both components of the crystallized glass, that is, both the crystal phase and the residual glassy matrix, have the desired properties. It is a further object of this invention to adjust the initial formula of the coating and the crystallizing heat treatment so that both the crystal phases and the residual remaining glassy matrix have the desired properties without sacrificing the mechanical strength of crystallized glass coatings.

Since the properties of the base metal limit the firing temperature and the firing time, the initial firing temperature must be relatively low, particularly for economical application to mild steel and other non-refractory base metals. Further, since it is necessary for the coating, at least initially, to completely fuse in order to form a continuous coating over the base metal, the coating must be easily fusible within the temperature limitations imposed by the base metal. For this reason, another object of this invention is to provide an amorphous coating that will fuse easily to cover non-refractory base metals at relatively low temperatures, which will then crystallize in place to provide a coating which will withstand a temperature higher than the uncrystallized glass is capable of standing, and limited only by the high temperature strength of the base metal.

Since the nucleation and crystallization of glasses to form a poly-crystalline composite material takes a certain amount of time, it has been found desirable in certain cases to subject the glass to partial heat treatment prior to the application to the base metal. This is particularly true in slowly crystallizing formulations where the entire heat treatment cycle may be so long as to be detrimental to the base metal. In other cases, particularly where large apparatus is being manufactured, the prolonged heat treatment cycle is very costly since a single piece of apparatus may occupy a large and expensive furnace for an undue length of time. In both these cases, it has been found desirable to pre-treat the glass to either begin nucleation or to partially begin crystallization of the glass when it is in frit stage, and then to grind said nucleated or partially crystallized glass, apply the same in the normal manner to the apparatus. It is another object of this invention to provide a process for preheat treating an amorphous glassy material to begin the nucleation or crystallization thereof prior to the application of the same to the base metal.

Other objectives of this invention are the provisions of a better non-metallic coating of poly-crystalline-vitreous nature.

Further objects include the provision of such a coating in a reliable inexpensive method for production of a coating having the advantages of glassy vitreous enamel, together with greatly enhanced physical properties.

Other objects and advantages of this invention will be particularly set forth in the claims and will be apparent from the following description when taken in connection with the accompanying drawing, in which:

FIG. 1 is a curve showing the stress existing in a layer of partially crystallized glass coating applied on a metallic base as a function of the temperature of the coated system.

This invention is based, at least in part, upon the discovery that certain glass compositions may be crystallized, that the crystallization may be accelerated by the physical form of the amorphous glass, that the amorphous glass may be applied to metallic bases and crystallized in situ to form a poly-crystalline-amorphous ceramic coating, and that the properties of the coating material may be adjusted with relation to the properties of the base metal and to the environmental condition of use to form coatings superior to those heretofore known.

It is known that the mechanical strength, abrasion resistance, and other desirable properties of glasses can be greatly enhanced by controlled crystallization or devitrification. For example, the patent to Stookey, No. 2,920,971, discloses a semicrystalline ceramic composition comprising a continuous amorphous phase and a crystalline phase or phases evenly distributed throughout. Stookey produces his crystalline phase by controlled nucleation and subsequent devitrification of the glass composition, thereby growing the crystals in situ.

In order to cause glasses to crystallize, it was heretofore considered necessary to include in the batch composition a so-called "nucleating agent" which is capable of separating from the batch in the form of nuclei, or very small crystals. In the patent to Stookey, mentioned above, methods for forming glasses having substantial crystalline components are disclosed, with the use of titanium dioxide in substantial amounts as a nucleating agent. However, we have found that while titanium dioxide is effective as a nucleating agent, the presence of this material in the glass is not essential for the successful formation of partially crystallized glasses. A large number of glass compositions may be successfully crystallized if properly heat treated although no titanium is present in the batch.

Table I, given below, sets forth a series of glasses, some of which contain titanium and others which are titanium free, which have been found suitable to crystallize.

The heat treatment of these glasses may vary considerably depending upon the results to be obtained. For example, in a preliminary study involving glass rods of the above compositions, a double heat treatment was used involving a nucleation heat treatment in a temperature range of from 200° C. to 650° C. for heating periods of from 17 to 165 hours. The subsequent crystallization temperature ranged from 650° C. to 830° C. for heating periods of from 2 to 17 hours. It was found with composition No. 1 (see Table I) that the maximum strength was obtained with a nucleation temperature of 162 hours at a temperature of 400° C., and a subsequent crystallizing time of 4 hours at 700° C. After this treatment, the average modulus rupture of rods of this composition was 49,600 lbs. per square inch or approximately 4.6 times as great as the modulus of the same glass before heat treatment. The crystal phases present therein appear to be substantially beta-spodumene plus $Mg_2TiO_4$. These crystal compositions were obtained by X-ray diffraction methods, and are not to be considered as precluding the existence of other crystalline phases in the glass; it merely indicates the presence of these phases.

It was found that small amounts of crystal phases ranging from approximately ½ to approximately 5% of a crystal size ranging from 500 angstroms to 10 microns in size produced the greatest increase in strength in the glass rods during experimental runs. However, these data are not provided to be completely applicable to similar

TABLE I.—WEIGHT PERCENT OF VARIOUS CRYSTALLIZED GLASS COMPOSITIONS

| Oxides | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $SiO_2$ | 58.0 | 58.0 | 59.5 | 64.8 | 61.3 | 64.5 | 59.4 | 59.6 | 55.3 | 52.2 | 58.4 | 56.5 | 60.0 | 55.5 |
| $TiO_2$ | 12.8 | 12.8 | 13.2 | | | | | | 15.5 | 20.1 | 11.0 | 17.7 | 14.1 | 8.6 |
| $CeO_2$ | | | | | 5.9 | 0.8 | 8.6 | 5.7 | | | | | | |
| $MnO_2$ | | | | | | | | 6.2 | | | | | | |
| $Li_2O$ | 5.1 | 8.1 | 7.5 | 8.3 | 7.5 | 7.9 | 7.3 | 7.3 | 6.7 | 9.5 | 4.1 | 6.8 | 4.1 | 9.1 |
| $Na_2O$ | 6.7 | 6.7 | 2.1 | 7.5 | 7.1 | 7.5 | 6.9 | 6.9 | 9.1 | 5.5 | 12.8 | 9.5 | 13.3 | 6.7 |
| $MgO$ | 3.9 | 2.4 | 4.0 | 4.4 | 4.1 | 4.3 | 4.0 | 4.0 | | | | | | |
| $CaO$ | 3.4 | 1.9 | 3.5 | 3.8 | 3.6 | 3.8 | 3.5 | | | | | | | |
| $Al_2O_3$ | 10.1 | 10.1 | 10.1 | 11.3 | 10.7 | 11.2 | 10.4 | 10.4 | 5.9 | 8.2 | 3.5 | 5.9 | 3.5 | 12.4 |
| $B_2O_3$ | | | | | | | | | 1.7 | 1.0 | 2.4 | 1.9 | 2.6 | |
| $LiF$ | | | | | | | | | 2.5 | 1.5 | 3.6 | 1.9 | 2.6 | |
| $ZrO_2$ | | | | | | | | | 3.2 | 1.9 | 4.5 | | | |
| $Fe_2O_3$ | | | | | | | | | | | | | | 5.0 |
| $SrO$ | | | | | | | | | | | | | | 2.8 |

Table II, given below, shows a second group of glasses which have been found suitable for crystallization. It is to be noted that all of the glases given below are titanium free.

compositions crystallized in situ upon a metal base, since the relative strength of the glas rods and impact resistance of similar crystallized coatings on metal substrates were not completely parallel. For this reason, the strength data

TABLE II

| Oxides | 1 | 2 | 3 | 4 | 5 | 6 | 7 | 8 | 9 | 10 | 11 | 12 |
|---|---|---|---|---|---|---|---|---|---|---|---|---|
| $SiO_2$ | 62.5 | 62 | 61.5 | 62.43 | 62.5 | 62 | 62.5 | 62 | 64.5 | 63.9 | 66.3 | 65.7 |
| $Al_2O_3$ | 12.1 | 12 | 11.9 | 12.08 | 15.13 | 15 | 15.13 | 15 | 15.6 | 15.48 | 16.03 | 15.92 |
| $B_2O_3$ | 6.56 | 6.5 | 6.45 | 6.54 | 6.56 | 6.5 | 3.03 | 3 | | | | |
| $Na_2O$ | 4.03 | 4 | 3.97 | 4.02 | 4.03 | 4 | 7.56 | 7.5 | 7.8 | 7.74 | 8.02 | 7.96 |
| $K_2O$ | 3.03 | 3 | 2.98 | 3.02 | | | | | | | | |
| $Li_2O$ | 9.08 | 9 | 8.93 | 9.07 | 9.08 | 9 | 9.08 | 9 | 9.37 | 9.28 | 9.64 | 9.56 |
| $CaO$ | 1.51 | 1.5 | 1.49 | | | | | | | | | |
| $ZnO$ | 1.21 | 1.2 | 1.19 | 1.21 | | | | | | | | |
| $Cr_2O_3$ | | 0.8 | 1.6 | 1.62 | | 0.8 | | 0.8 | | 0.825 | | 0.793 |
| $SrO$ | | | | | 2.72 | 2.7 | 2.72 | 2.7 | 2.8 | 2.78 | | |

In addition to the above, it is possible to crystallize antimony glasses such as the following:

TABLE III

| Oxides: | Weight percent |
|---|---|
| $SiO_2$ | 58.8 |
| $Li_2O$ | 7.5 |
| $Al_2O_3$ | 11.6 |
| $Na_2O$ | 10.1 |
| $TiO_2$ | 6.1 |
| $MoO_3$ | 2.9 |
| $Sb_2O_3$ | 2.9 | obtained by study of experimental crystallized rods will not be further given, since the principle object os this invention is the production of crystallized coatings on a metallic base.

It is to be noted that both the nucleation and the crystallizing heat treatments given above are quite long. It has been found that said long heat treatment period including a lengthy nucleation treatment followed by a crystallization treatment will cause crystallization of all of the glasses in the above tables. However, when these glasses are applied to a metallic base, the heat treatments rquired to provide a substantially complete crystallization are considerably shorter. One explanation of this discrepancy is the fact that the crystallization or devitrification of glass appears to be a surface phenomenon related to the surface energy of the glass being treated. In other words, it appears that the crystallization initially takes place on the surface of the glass and gradually progresses inwardly into the body until, after an extended period of time, the entire glass is crystallized. Where the glass exists in a finely divided form as for application to a metallic base, each of the glass particles will begin to nucleate and to crystallize on the surface during the period when they are being heated to the fusion point for forming a continuous coating on the surface of the base metal. Moreover, as these glass particles approach the fusion temperature, they tend to "slump" or flatten out which increases the surface area to volume ratio as the particles depart further and further from spherical configuration. During this period, the extended surface of the particle provides a large surface for the initiation of the crystallization. After the particles have coalesced to form a continuous coating, the large number of nuclei and crystals which have been initiated as described above are scattered throughout the body of the coating, thereby permitting crystallization to take place relatively quickly in order to produce a completely crystallized coating. For this reason, it has been found that many slowly crystallizing glasses, which would have very limited usefulness for the production of bulk articles of crystallized glass are nevertheless useful if the recrystallization is initiated while the glass is in finely divided form as described above.

Moreover, the understanding of this phenomenon provides a means for control of the crystallizing process by controlling the average particle size of the finely divided particles as applied to the metallic base. The finer the glass has been ground prior to the formation of the enamel slip for the coating process, the more rapid and complete the crystallization will be for any given heat treatment. Thus, it is possible to vary the degree of crystallization on any particular object to be coated by merely applying a more finely ground slip to the portions where accelerated crystallization is desired.

Since one of the important end uses of partially crystallized glass coatings of the nature described herein is for the production of corrosion-resistant coated apparatus, the problem of the chemical resistance of the various phases of the coating upon exposure to commonly used reagents is of importance.

In order to attack this problem systematically, samples of desirable mineral phases to be encountered have been subjected to corrosion tests in both the crystalline and amorphous states. These samples are preferably crushed and screened in order to provide samples having large relatively constant surface areas in order to permit comparative evaluation of the corrosion resistance of the various materials.

An example of a test which was found satisfactory for forming a basis for evaluating the phases to be considered in forming nucleated glass coatings according to this invention was carried on as follows: The samples to be investigated were crushed in an inert mortar and the crushed material transferred to a nest of sieves for separation. A uniform sample was taken having particles which pass through a 35 mesh sieve (No. 40) but remain on a 48 mesh sieve (No. 50) yielding a sample having particle size ranging from approximately 297 to 420 microns. These particles are then washed with alcohol in order to remove any mechanically adhering fines, and after careful drying, a sample was weighed out for the corrosion test itself. The corrosion test in one case comprised a treatment of the sample in a 50 ml. of 0.02 N sulfuric acid at 95° C. for a period of four hours. However, it is to be understood that the reagents and temperatures used for the test should be related to the reagents and other environmental factors which the coating will encounter in service. After the test, the decrease in the weight of the samples and the consumption of the sulfuric acid during the treatment were determined. The results can be summarized in the following table.

TABLE IV

| Material | Amt. used in Test (gm.) | Results | | |
|---|---|---|---|---|
| | | Decrease in Wt. in percent | Consumption of 0.02N $H_2SO_4$ in ml./10 g. | Equivalent amt. of $Na_2O$ in mg./10 g. |
| Rutile | 3.3480 | 0.045 | 5.53 | 3.4 |
| B Spodumene | 3.0622 | 0.718 | 48.0 | 29.8 |
| Glass | 2.0630 | 0.1115 | 40.0 | 25.4 |
| Crystal | 1.9197 | 0.0834 | 38.6 | 23.9 |
| $Li_2O$ Glass | 1.2445 | 5.11 | 581 | 360 |
| $SiO_2$ Crystal | 1.2478 | 5.22 | 589 | 365 |
| $Li_2O$ Glass | 0.9617 | 1.27 | 475 | 294 |
| 2 $SiO_2$ Crystal | 1.4394 | 0.54 | 156 | 96.7 |

Although the above tests do not yield absolute corrosion rates for the materials tested, they do yield comparative data which permits the evaluation of various materials and gives sufficient indication to determine which are suitable for use in a particular environment. It is to be understood that these particular tests are given herein for the sake of example only to show the steps which could be taken by anyone skilled in the art as part of the rational design of crystallized coatings for resisting any particular reagent or for any particular service. It is clear that if it is desired to design a coating for resisting other reagents, the steps to be followed would be equivalent to those outlined above. The resulting data would then be correlated with the other characteristics desired in the coating as herein explained, thereby permitting the logical choice of the materials having the largest over-all desirability for the purpose in question.

As stated above, the properties of the crystallized glass must be adjusted to "fit" the base metal to be coated in order to limit the stress in the glass to obtain the maximum durability and thermal and mechanical shock resistance. Since glass and ceramic material in general, and crystallized glass in particular, are considerably stronger in compression than in tension, it is desirable that the residual stress be of compressive rather than a tensile nature. Further, it has been found through experience, both in the vitreous enamel art and by testing crystallized glass coatings, that magnitude of these stresses should lie between 8000 and 30,000 pounds per sq. inch (as measured by the techniques set forth below) and preferably in the range between 16,000 and 24,000 pounds per sq. inch for maximum durability and shock resistance. In order to successfully coat any particular base metal, it is therefore necessary to adjust the formulation and method of application of the coating to attain compressive stresses of the order of magnitude described above. It is clear that it is necessary to prepare different formulations for attaining the same stress on base metals of different natures. A formulation and method of application which would attain this end on a base of mild steel would not necessarily give desirable results on a different base metal such as, for example, stainless steel or one of the refractory metals. It is, therefore, necessary to adjust the formulation and method of application to suit each particular base metal.

It has also been found that high compressive stresses are more desirable on concave surfaces than convex surfaces. The compressive stress on a concave surface tends to force the glass against the metal, and improves the adherence and durability of the coating. On the other hand, high compressive stresses on convex portions actually tend to cause the coating to flake or spall off the convex surface, and therefore, stresses of a smaller order of magnitude are desirable. On sharp convex surfaces, such as flanges and the like it is desirable that the compressive stress not exceed 14,000 lbs. per square inch.

From the above discussion it can be seen that in order to rationally design a nucleated coating to "fit" a particular application, it is necessary to take the residual stress of the coating into account. In order to facilitate the formulation of a satisfactory coating, it is therefore necessary to understand some of the factors entering into the final results and to be able to measure, in a quantitative fashion, the results of changes in formulae made in accordance to the general rules which are herein described.

There are two methods for controlling the magnitudes of the stresses in the coating applied to a metallic base. The first method is adjustment of the formulation of the coating to attain a material having the desired coefficient of expansion with relation to the metallic base, and the second is by adjusting the formulation to effect the "set point" of the coating.

The importance of the set point can be understood when it is appreciated that the coating is in a viscous semi-fluid condition when it is fired on the metallic base. As the coated base is cooled, the coating can adjust to the changing dimensions of the contracting base metal as long as it remains in a viscous condition. However, at the set point, the viscosity of the coating becomes so great that it cannot adjust to the contraction of the metallic base, and the formation of the stresses in the coating begins. The lower the set point of the coating, the nearer to room temperature the system can be cooled prior to the initial formation of stresses in the coating, and the lower the final stresses in the coating when the coated base has reached room temperature. Thus, even in cases where the difference in coefficient of expansion of the coating and the base metal differ markedly, if the coating has a low enough set point, the final stresses in the coating at room temperature may be relatively low since the stresses do not begin to build up until the coated article is relatively cool.

It has been found that the coefficients of thermal expansion of crystallized coatings depend mainly on the coefficient of expansion of the vitreous or glassy phase and only to a smaller extent on the coefficient of expansion of the crystalline portion thereof. The coefficient of the glassy phase may be adjusted by varying the composition. For example, an increase in the proportion of sodium oxide in the glass. A substitution of iron oxides for aluminum pansion with a resultant decrease in the compressive stresses in the final coating. The opposite effect has been attained by the increase in the percentage of boron oxides in the glass. A substitution of iron oxides for aluminum oxides decreases the residual stresses. Increases in the compressive residual stresses are caused by an increase in the proportion of lithium oxide, but in this case the crystalline portion of the coating is increased and this causes both an increase in the set point as well as a lowering of the coefficient of expansion.

The set point of the coating is also dependent on the melting point of the glassy or vitreous phase of the coating. An increase in the proportion of the refractory oxide, such as for example, aluminum oxides, silica, or magnesium oxides would increase the temperature of the set point, and therefore tend to increase the residual stresses in the coating. Other of the refractory or high-melting oxides have, of course, a similar effect.

These principles can be used to advantage by any ceramist skilled in the art in order to adjust both the coefficient of expansion and the set point of the coating either upwardly or downwardly as desired to attain the coating to "fit" any given base. However, the understanding of the mechanism and the glasses and crystalline ceramics is not far enough advanced at the present time to permit theoretical predictions of the properties of the final glass or crystalline structure in an exact quantitative manner and therefore, a quantitative method for measuring the effects of adjustments and formulation is required for the formulation of coatings having optimum properties for any particular base.

It has been found most convenient to measure the stresses existing in the base-coating system directly rather than to measure the coefficients of expansion, set points and the other factors separately and to calculate the final stress. For this reason, a procedure for carrying out this measurement quickly and efficiently in the laboratory will now be given.

A convenient apparatus for carrying out the measurement of the residual stress comprises a means for supporting one end of a thin strip of coated base metal to be coated, a controllable furnace, and means for measuring the deflection of the other end of the strip at various temperatures. For example, if a strip of the base metal in question is coated on one side with the formulation to be investigated and then cooled, the coating on the strip will be under compressive or tensile stress depending upon the composition of the coating. If the strip is thin enough, the compressed coating on one side will cause the strip to assume a curved position, the radius of this curve depending on the degree of compression in the glass. The principle of this instrument is similar to that of the bimetallic strip commonly used for temperature measurements wherein a composite strip of two materials having different coefficients is subjected to a change of temperature. One of the materials will expand (or contract) to a greater degree than the other during the change in temperature, and the bi-metallic strip will assume a curved configuration with the material which has undergone the greater expansion being on the outside of the radius of the curve when the strip is heated. The thin strip of base metal coated with crystallized glass acts in a similar manner, with the coating acting as one of the metals in a bi-metallic strip. Thus, where a thin straight strip of the base metal being investigated is coated with a coating formulation, and slowly cooled, the strip begins to deflect as soon as the coating passes through its "set point." The magnitude of the stress in the coating can be calculated from a modulus of elasticity of the strip and the amount of deflection.

As an example of this procedure, a specimen of 10-gauge steel, 6 inches long and 1 inch wide, was given a ground coating on both sides using a formulation very similar to that described in Table IX below. This ground coat was then fired on in the usual manner so as to obtain an equal coating on both sides of the specimen of a thickness of approximately 0.008 inch. After being ground coated, the center 4 inches of one side of the strip was coated with the crystallized cover coat under investigation. This cover coat was then fired in an electric furnace to fuse the coating, then cooled slowly to room temperature.

The top end of the strip was then clamped in a vertical position in a controllable furnace, with the lower end hanging free. The furnace was then heated at a rate of approximately 8° C. per minute, and the deflection of the strip was measured. The deflections as observed were then converted to stress in pounds per sq. inch. The results are shown by the curve in the drawing.

Referring to the figure, it can be seen that the initial stress at room temperature was indicated to be about 20,000 lbs. per sq. inch. This stress decreased in almost a straight line as the temperature rose, since the base metal expanded more rapidly than the coating, thereby relieving the compressive stress in the coating. At a temperature of approximately 750° F., the strip was substantially straight indicating that the stress in the coating material had been completely relieved and the coating was in a condition of zero stress. Further heating produced a reverse curvature in the strip indicating that the coating was now under tension, the base metal having expanded to such a degree that it was now actually longer than the coating. At approximately 900° F., the strip began to straighten out again, and at a temperature of 1000° F. and above, the strip remains straight. This indicated that at approximately 900° F. the coating had begun to soften so that it began to conform to the dimensions of the base metal, thereby relieving the stress. The coating had completely softened at a temperature of approximately 1000° F., so that no further stresses were possible above this temperature.

It may be seen that by applying the above technique, the residual stresses to any base metal formulation system can be evaluated. By applying the technique described above any starting formulation can be "fitted" by means of adjusting the thermal expansion characteristics and the set point of the coating so that it can be made to fit the particular base metal to be coated.

To summarize the above, when the ceramist is required to formulate a coating for a given base metal to encounter particular service, it is necessary to proceed according to the steps outlined above. The first step is to evaluate the resistance to the given service environment of the various glass formulations and crystalline compositions. If such data is not available in the literature, it may be readily determined by standard laboratory corrosion testing techniques such as those described above in connection with the crystalline phases set forth. When it has been determined which crystalline phases and which amorphous glass formulations are resistant to the desired environment, the calculation hereinafter set forth can be used to determine initial compositions which will, upon nucleation, yield a coating having the desired crystalline phases in combination with the desired amorphous glassy matrix therebetween. Once this has been done, then the formulation is tested with the desired base metal for "fit" by the residual stress determining apparatus such as that described above. Should it be discovered that the residual stresses in the desired formulation do not fall within the desirable range given above, then adjustment may be made in the composition of the vitreous or glassy matrix according to either of the two principles described above. For example, if the stress is too low, it may be increased by increasing the "set point" of the glassy composition by increasing the proportion of a refractory oxide such as aluminum oxide or magnesium oxide in the formulation. Successive adjustment may be in both the set point and the coefficient of expansion of the glassy phase, until the residual stresses in the coating fall within the desired range. When this has been done, the formulation arrived at will be suitable for coating the base metal in question and will be suitable for the environmental conditions to be encounted. In connection with this, it might be pointed out that the formulation may be altered for use on different portions on the same object to be coated in order to have different residual stresses on portions of different configurations.

The above technique can also be used to evaluate the heat treating cycle which results in the nucleation and crystallization of the glass to form a nucleated glass coating. For example, a rapid rise in temperature may result in fusing of the coating with the production of relatively few nuclei while a slow rise in temperature may result in a fused coating containing large quantities of crystal nuclei in the glass. These conditions of heat treatment can be duplicated and studied in the laboratory and the results in terms of residual stresses can be studied by the techniques described above to arrive at satisfactory control of the final process prior to full scale production.

A better understanding of the application of the above mentioned principles and methods can be most clearly obtained by reference to the following example:

For the purposes of illustration it will be assumed that it is desired to apply a coating having resistance to hydrochloric acid at the boiling point to mild steel. This sets out certain criteria which the coating will have to meet as follows:

(a) Since the coating is to be applied to mild steel, the firing temperature should not exceed approximately 1600° F., since higher firing temperatures are apt to cause warpage and excessive oxidation of the base metal.

(b) The compressive stresses should be approximately 12,000 to 16,000 pounds per square inch at room temperature, and the coefficient of thermal expansion of the coating must be adjusted to give these values on mild steel.

(c) The acid resistance to boiling hydrochloric acid should be good. As a practical criteria, the corrosion should not exceed 30 to 40 mils per year in boiling 20% hydrochloric acid in the vapor phase.

(d) In order to meet commerical standards, the thermal shock resistance should be approximately 450° F. This means that the coating should be able to withstand being heated, and cooled through a range of 450° F. by a water quench without showing any signs of cracking or crazing.

The first step in approaching a problem of this nature is to select a residual glass which has properties that are similar to the requirements of the coating, and which would be affected by the various crystal phases in such a way as to give the needed properties. For example, the residual glass should have a higher coefficient of thermal expansion than desired for the final coating since the precipitation of crystalline phases having relatively small co-efficient of expansion such as for example beta spodumene will considerably reduce the same. Therefore, initially, a glass composition having approximately 75% the desired compressive stress on mild steel at room temperatur is a good starting point for the formulation of such a glass.

Many glass formulations are given in the literature together with their coefficients of expansion and chemical resistance, and any one of the suitable glasses could be selected as a starting point in this project. It has been found that the following composition would be suitable for this purpose.

TABLE V

| Oxides: | Wt. percent |
|---|---|
| $SiO_2$ | 65.0 |
| $Na_2O$ | 11.0 |
| $B_2O_3$ | 9.0 |
| $TiO_2$ | 5.0 |
| SrO | 3.0 |
| $Li_2O$ | 7.0 |

When this glass composition is smelted, and reduced to a powder, applied to a base metal disk, and subjected to 20% hydrochloric acid in the vapor phase at the boiling point, it was found that the corrosion rate was approximately 16.5 mils per year. Since this is well within the criteria set forth above, this glass will be suitable for the residual glassy or amorphous phase of the coating from a corrosion resistance standpoint.

It was assumed, as a starting point, that it would be desirable that approximately 50% of the polycrystalline-amorphous ceramic coating comprise the residual glass composition, and approximately 50% should be in the crystalline phase. This assumption is based on the estimate that a larger percentage of the crystalline phase would probably result in a firing temperature higher than could be tolerated within the criteria described above for a coating of mild steel. Accordingly, this will be used as initial percentage for calculating the formulations.

In the selection of the crystal phase, it is necessary to run corrosion test on the crystalline phases which are intended to be used. In certain cases, as with well-known minerals such as rutile, beta spodumene, and the like, this data is relatively available in the literature; if it is not, this data must be obtained in the laboratory by the methods herein outlined. In any case, the selection of the crystalline phase should be such that the corrosion resistance which is the end result desired in such a coating is not signficantly degraded by the addition of this phase.

In this particular case, it was found that beta spodumene and lithium titanium silicate have relatively good corrosion resistance when exposed to hydrochloric acid. The coefficient of thermal expansion of lithium titanium silicate is approximately 8.6 times $10^{-6}$, which is considerably larger than that of beta spodumene, whose coefficient is very close to zero. Thus, in order to avoid severe changes in the coefficient of expansion of the finished coating, 30% of the total coating weight is composed of lithium titanium silicate and 20% of beta spodumene.

Having made these preliminary decisions, it is then necessary to calculate the starting weight of the ingredients to be added to a glass so that, if the crystal phases come out as desired, the residual glass composition will be that given in Table V. A sample calculation follows:

Since the formula beta spodumene is $$Li_2O \cdot Al_2O_3 \cdot 4SiO_2$$

the weight percent of each of the following oxides in lithium titanium silicate is given in Table VI. Each of the weights is multiplied by 0.20 since this constituent will be 20% of the finished coating, to give the total coating composition of each of the oxides and the total coating composition necessary to cause 20% of beta spodumene to crystallize.

TABLE VI

| Oxide | Wt. Percent | Wt. Percent of total coating comp. |
|---|---|---|
| $Li_2O$ | 8.03×.20= | 1.61 |
| $Al_2O_3$ | 27.30×.20= | 5.46 |
| $SiO_2$ | 64.60×.20= | 12.92 |

By similar calculation for lithium titanium silicate, $Li_2O \cdot TiO_2 \cdot SiO_2$, the weight percents in the total coating composition necessary to crystallize 30% of lithium titanium silicate are given in the following table:

TABLE VII

| Oxide | Wt. Percent | Wt. Percent of total coating comp. |
|---|---|---|
| $Li_2O$ | 17.55×.30= | 5.27 |
| $TiO_2$ | 47.00×.30= | 14.10 |
| $SiO_2$ | 35.35×.30= | 10.60 |

Adding the oxide percentages given in Tables VI and VII above, together with 50% of the oxide percentages given in Table V, gives an over-all percentage of oxides as follows:

TABLE VIII

| Oxide: | Weight percent of total coating comp. |
|---|---|
| $SiO_2$ | 56.02 |
| $Na_2O$ | 6.50 |
| $B_2O_3$ | 4.50 |
| $TiO_2$ | 16.60 |
| SrO | 1.50 |
| $Li_2O$ | 10.38 |
| $Al_2O_3$ | 5.46 |

The object to be coated, in this case comprising a vessel of fabricated mild steel, is first prepared in the usual way for porcelain enameling. The surface is first thoroughly cleaned and sand blasted to remove all traces of foreign matter, scale, and the like which could interfere with the adhesion of a subsequently applied coating. The clean and sand blasted base is then given a coat of ground-coat enamel in the usual manner. This ground-coat enamel is especially formulated to produce an adherent bond with the base metal in order to bond the sebusequent corrosion resistant cover coats securely to the object to be coated. A typical formula for enamel ground coat suitable for use for this purpose is as follows:

TABLE IX

| Oxides: | Weight percent |
|---|---|
| $B_2O_3$ | 16.0 |
| $Na_2O$ | 14.7 |
| $K_2O$ | 4.4 |
| $SiO_2$ | 48.6 |
| $Al_2O_3$ | 6.4 |
| CaO | 4.0 |
| $F_2$ | 3.7 |
| $Co_3O_4$ | 0.6 |
| $MnO_2$ | 1.7 |

The above materials are smelted to form a homogeneous glassy material, which is generally reduced to a course frit by pouring into cold water. The resulting granulated mass is then ground in water together with various mill additions to form an "enamel slip" which is a thin liquid approximating the consistency of paint. This liquid is then applied to the surface to be coated by a spraying, dipping, slushing or any other of the known enameling techniques. The coated surface is then dried and fired at a temperature of approximately 1600° F. for approximately 30 minutes. This firing process causes the particles of enamel to fuse and to adhere tightly to the base metal to form a uniform glassy coating thereon. This procedure as herein described is known, and forms no part of this invention.

When the ground coat has been applied as described above, the object is ready for receiving its first cover coat of the formulation set forth in Table VIII.

After the formulation has been made up as described above, the components are smelted to form a glassy composition. This glassy composition is then fritted by being quenched in water (or dry quench) in order to reduce it to the granular state. At this stage in the process, the coating material is completely amorphous or glassy, and to all appearances is identical with the known types of vitreous enamel.

The above frit is then dry milled or wet milled depending on whether it is to be applied by dry or wet processing techniques. If the frit is wet milled. it is reduced to a thin paint-like suspension suitable for the application to a surface by spraying, dipping or the like. If the material is dry milled, it is reduced to a fine powder which may be dusted upon the hot surface. In either case the frit should preferably be milled until no more than 15% will remain on a 200 mesh screen. The coating is then fired at a temperature which varies with the viscosity of the glass, but would in the case of the formulation given in Table VIII, be in range of from 1400° F. to 1700° F. The heating rate of the coating is important at this point since it will have a substantial effect on the rate of crystallization of the coating. Should the heating rate be too slow, there is danger that the coating might crystallize and become refractory prior to proper fusion. If this should happen, the coating would never attain the thin flowable stage which is necessary in order to provide a uniform glossy continuous coating on the object to be fired. On the other hand, if the heating rate is too fast, the coating may become too fluid during this stage of the cycle and could produce runs or sags in the finished product.

It has been found that a certain amount of crystallization during initial firing of the enamel coating can be beneficial since it will reduce the necessary time required for further heat treating. This partial crystallization or nucleation which occurs during this stage of the cycle is similar to and can be controlled in a manner similar to that which occurs during subsequent heat treatment. For this reason, the rate of firing during the initial fusing should be considered as part of the total nucleating heat treatment process, and subsequent heat treatment must be adjusted to take account of the rates of firing occurring during the initial fusing of the coating. However, should this prove to be undesirable, it is possible to fire the coating at temperatures which will keep it in the completely glassy or amorphous stage, and then nucleate the crystals at a somewhat lower temperature (approximately 1100° F.) and then heat treat to obtain the desired crystal structure in the coating.

After the coating has been applied and fused as described above, it is then subjected to a heat treating cycle for crystallizing the coating. The heat treatment of compositions such as those set forth above on a mild steel base will generally range from a temperature of 1300° F. to 1600° F. for periods of from 1 to 3 hours. The temperature and duration of this treatment is limited by the resistance of the base metal to oxidation. However, if it should be necessary, this treatment could be carried on under a non-oxidizing atmosphere to prevent any deterioration of the base metal during longer heat treatment times.

It has been found that a treatment such as that described above will yield a coating containing many small crystals ranging from sub-microns to 100 microns (with the bulk being under 1 micron) in size uniformly dispersed throughout the glassy matrix. Such a coating properly crystallized has a mechanical strength (as measured by bending tests of crystallized glass rods) of three to over four times of that of the uncrystallized or amorphous glass.

The coefficient of linear expansion of a coating such as that described above, would range from approximately 7.5 to 11.0 x $10^{-6}$ inches per inch per degree Centigrade. As described above, this can be adjusted by small compositional changes in order to fit the particular metal but the above range has been found generally satisfactory for coating mild steel bases. However, the coefficient of linear expansion is not the ultimate test since, as described above, the set point of the coating also has considerable effect on determining the magnitude of the stress of the finished coating base metal. For this reason, the fitting of a composition to any particular base metal should be done by use of the stress measuring techniques herein described.

It is to emphasized that the percentages given above are not absolute percentages suitable for all purposes. If substantially all of the crystallizable elements crystallize to form the crystalline phases as defined above, the residual glassy phase would contain oxides as shown in Table V. However, although these percentages are not absolute, it has been found, by X-ray diffraction and other measuring means, that the crystalline phases approach those given in Tables VI and VII.

The physical properties of the polycrystalline glass as formed in the above example have been measured and compared with the properties of similar glass prior to the crystallization. It has been found that the abrasion resistance is significantly increased, thermal shock resistance is substantially increased, and the refractoriness of the material is greatly increased. The mechanical strength (as measured by bending tests) is also increased. The corrosion resistance is slightly decreased but this effect can be controlled by a proper choice in composition, resulting in desirable corrosion resistant crystalline phases and a desirable corrosion resistant residual glass composition.

It is clear that the above formulation satisfies the initial criteria set forth above, and constitutes a satisfactory coating for mold steel apparatus intended to be exposed to the corrosive attacks of hydrochloric acid. However, should such a coating prove unsatisfactory in any respect, or should it be desired to adapt a similar coating for use on a different base material, whether metallic or non-metallic, the application of the principles and the teachings set forth above, clearly indicate the modifications which must be made.

As pointed out above, the coatings on convex surfaces of small radii should have smaller residual stresses. To this end, it is often desirable to alter the composition of the coating for the application to different parts of the same article. For example, it may be desirable to coat the inside of a large piece of chemical processing apparatus with the coating of one formulation and to apply the coating of a somewhat modified formulation to convex radii of the nozzles, flanges and other fittings. Moreover, when coating large pieces of apparatus of complex shape, the coating on certain parts of the apparatus may contain a greater proportion of crystals than others due to differential heating effects. For example, massive portions of the apparatus to be coated may be brought to crystallizing temperatures more slowly than the smaller portions, and this difference in the heat treatment of various parts of the same apparatus may result in diverse properties of the coating on these various parts. This effect may be corrected by applying coatings of different compositions to various parts of the same apparatus in order to attain the most desirable over-all properties in the coating over the entire surface being coated.

The foregoing example is intended to be illustrative of the methods of applying the principles broadly set forth herein. Obviously, any one skilled in the ceramic or glass making arts, could apply the teaching set forth above to formulate a coating to fit any base, and, within the limits set by the available materials, to perform any desired service. In particular, other crystalline phases such as beta eucryptite, rutile, brookite, lithium metasilicate, lithium disilicate, sphene, crystobalite, $Mg_2TiO_4$, $MgTiO_3$ and $Mg_2TiO_5$, have proven satisfactory for various purposes.

The range of usefulness of this invention is not restricted to the corrosion resistant coatings described above, since crystallized glass coatings may also be useful in other entirely different fields. For example, such coatings may be designed to have desirable dielectric properties to serve as hydrogen diffusion barriers or to be opaque or transparent to radiation of sub-atomic particles, such as, for example, neutrons. It is well known that certain constituents of glasses and various crystalline particles have particular properties in these and other allied fields. For this reason, by the application of the principles and methods described above, a formulation could be developed by persons skilled in the art to coat metallic or other bases with nucleated glass containing the constituents having the desired properties for the purposes in hand. For this reason, the scope of this invention is not restricted to the examples given above. The foregoing description and examples are intended to be construed in an illustrative rather than a limiting sense, and should be construed broadly within the scope of the appended claims.

We claim:

1. A fabricated metal vessel suitable for processing chemicals and the like having a fused ceramic coating covering at least a major portion of a surface of said vessel to improve the resistance of said surface to corrosion, said ceramic coating comprising a glassy layer bonded on one side to said surface but with its other side exposed and presenting a smooth, uninterrupted surface, said glassy layer having a substantial compressive stress not greater than about 30,000 p.s.i. and having distributed therethrough a substantial proportion of crystals formed by crystallization in situ, most of which are not larger than about 100 microns in size, and which constitute less than 50% by weight of the layer and serve to increase the resistance of the glassy layer to abrasion, impact and thermal shock, said glassy layer being formed from a glass composition comprising from 40 to 70% $SiO_2$, 3.5 to 20% $Al_2O_3$ and 10 to 25% of alkali oxide.

2. A fabricated metal vessel as defined in claim 1 in which the glassy layer contains at least one glass constituent selected from the group consisting of $CeO_2$, $MnO_2$, $ZrO_2$, $TiO_2$, $Sb_2O_3$, $Cr_2O_3$, $Fe_2O_3$, $CaO$, $ZnO$, $SrO$, $MgO$ and $LiF$.

3. A fabricated metal vessel as defined in claim 1 in which the fused ceramic coating is bonded to the metal by a fused enamel ground coat applied directly on the metal surface.

4. A process of coating a major portion of an exposed surface of a fabricated metal vessel suitable for use in processing chemicals and the like to improve the corrosion resistance of said surface which comprises:
  (A) applying an enameling ground coat to the cleaned metal surface of said vessel;
  (B) heating to fuse and bond the ground coat on the metal surface;
  (C) forming a powdered frit having at its principal constitutent a glass composition containing 40 to 70% silica, 2.5 to 20% alumina, and 10 to 25% of alkali oxide that is crystallizable at temperatures below 2000° F. and has a coefficient of expansion compared to the coefficient of the metal vessel to form a glassy coated layer of a compressive stress that is not greater than about 30,000 p.s.i.;
  (D) applying said frit to the ground coat bonded on said surface;
  (E) heating said apparatus and applied frit to from a continuous glassy coating layer bonded on one side to said ground coat and having its other side exposed by maintaining said glassy coating layer at a temperature between 1200 F. and 2000 F. for an effective time to crystallize a substantial portion but less than 50% by weight of said glassy layer.

5. A process definde in claim 4 in which the glass composition employed in the frit contains at least one glass constituent selected from the group consisting of $CeO_2$, $MnO_2$, $ZrO_2$, $TiO_2$, $Sb_2O_3$, $Cr_2O_3$, CaO, ZnO, SrO, $Fe_2O_2$, MgO and LiF.

6. A process as defined in claim 4 in which the powdered frit is of such particle size that no more than about 15% is retained on a 200 mesh screen.

References Cited
UNITED STATES PATENTS

| | | | |
|---|---|---|---|
| 2,436,825 | 3/1948 | Prior | 106—48 |
| 2,542,043 | 2/1951 | McIntyre | 117—129 X |
| 2,843,507 | 7/1958 | Long | 117—129 |
| 2,889,952 | 6/1959 | Claypoole. | |
| 2,920,971 | 1/1960 | Stookey | 65—33 |

OTHER REFERENCES

Little et al.: Materials Protection, June 1962, 40, 42, 44.

RALPH S. KENDALL, *Primary Examiner.*

ALFRED L. LEAVITT, *Examiner.*

UNITED STATES PATENT OFFICE
CERTIFICATE OF CORRECTION

Patent No. 3,368,712                          February 13, 1968

Elbert A. Sanford et al.

It is hereby certified that error appears in the above numbered patent requiring correction and that the said Letters Patent should read as corrected below.

Column 1, line 51, for "resitsance" read -- resistance --; column 2, line 49, for "metalic" read -- metallic --; column 3, line 13, for "sress" read -- stress --; column 4, line 51, for "objectives" read -- objects --; column 6, line 28, for "provided" read -- proved --; line 65, for "os" read -- of --; column 9, lines 42 and 43, beginning with "For example," strike out all to and including "in the glass." in line 48, same column 9, and insert instead -- For example, an increase in the proportion of sodium oxide in the glass causes an increase in the coefficient of expansion with a resultant decrease in the compressive stresses in the final coating. The opposite effect has been attained by the increase in the percentage of boron oxides in the glass. A substitution of iron oxides for aluminum oxides decreases the residual stresses. --; column 12, line 22, for "co-efficient" read -- co-efficients --; line 61, for "test" read -- tests --; line 67, for "phase" read -- phases --; column 13, line 7, for "a glass" read -- the glass --; line 17, beginning with "to give" strike out all to and including "crystallize." in line 20, same column 9, and insert instead -- to give the total weight percent of each of the oxides and the total coating composition necessary to cause 20% of beta spodumene to crystallize. --; line 72, for "sebusequent" read -- subsequent --; column 15, line 42, for "It is to" read -- It is to be --; line 65, for "mold" read -- mild --; column 17, line 13, for "at" read -- as --; line 23, for "from" read -- form --; column 18, line 4, for "definde" read -- defined --; line 8, for "$Fe_2O_2$" read -- $Fe_2O_3$ --.

Signed and sealed this 17th day of June 1969.

(SEAL)
Attest:

EDWARD M. FLETCHER, JR.             WILLIAM E. SCHUYLER, JR.
Attesting Officer                      Commissioner of Patents